(12) United States Patent
Facon et al.

(10) Patent No.: US 10,652,033 B2
(45) Date of Patent: May 12, 2020

(54) SYNTHETIC PHYSICALLY UNCLONABLE FUNCTION DERIVED FROM AN IMAGING SENSOR

(71) Applicant: SECURE-IC SAS, Cesson-Sévigné (FR)

(72) Inventors: Adrien Facon, Paris (FR); Sylvain Guilley, Paris (FR)

(73) Assignee: SECURE-IC SAS, Cesson-Sévigné (FR)

( * ) Notice: Subject to any disclaimer, the term of this patent is extended or adjusted under 35 U.S.C. 154(b) by 24 days.

(21) Appl. No.: 16/161,511

(22) Filed: Oct. 16, 2018

(65) Prior Publication Data

US 2019/0123916 A1 Apr. 25, 2019

(30) Foreign Application Priority Data

Oct. 20, 2017 (EP) .................................... 17306440

(51) Int. Cl.
*H04L 9/32* (2006.01)
*H04L 9/06* (2006.01)
(Continued)

(52) U.S. Cl.
CPC ........ *H04L 9/3278* (2013.01); *G06K 9/00577* (2013.01); *H04L 9/0662* (2013.01);
(Continued)

(58) Field of Classification Search
CPC ..... H04L 9/3278; H04L 9/0662; H04N 5/361; H04N 5/335; G06K 2009/00583
See application file for complete search history.

(56) References Cited

U.S. PATENT DOCUMENTS

2006/0063286 A1* 3/2006 Bidermann ........... H01L 23/544
438/17
2015/0199552 A1 7/2015 Du

FOREIGN PATENT DOCUMENTS

EP 1263208 A1 12/2002
EP 1608101 A1 12/2005

OTHER PUBLICATIONS

European Search Report for 17306440.3 dated May 11, 2018.
(Continued)

*Primary Examiner* — Christopher K Peterson
(74) *Attorney, Agent, or Firm* — Meagher Emanuel Laks Goldberg & Liao, LLP

(57) ABSTRACT

There is disclosed a method of handling a sensor, comprising the steps of: defining a subset of sensor components of the sensor; challenging said subset under uniform conditions; receiving output signal values from said subset; for each component of the subset, determining the statistical moment of order i of the temporal distribution of the output signal value of said each sensor component; determining one or more outliers sensor components, said outliers sensor components being components whose $i^{th}$ order statistical moment has a difference with the mean value of the spatial distribution of the chosen moment over the subset superior in absolute value to a threshold, the $i^{th}$ order statistical moment of one sensor component being estimated on the temporal distribution associated to this sensor component. Developments describe in particular the use of imaging sensors, key generation, authentication, helper data files and the handling of videos.

15 Claims, 4 Drawing Sheets

(51) Int. Cl.
    *H04N 5/335*     (2011.01)
    *H04N 5/361*     (2011.01)
    *H04L 9/08*     (2006.01)
    *G06K 9/00*     (2006.01)
    *H04N 5/225*     (2006.01)

(52) U.S. Cl.
    CPC ........... *H04L 9/0866* (2013.01); *H04N 5/335* (2013.01); *H04N 5/361* (2013.01); *G06K 2009/00583* (2013.01); *H04N 5/225* (2013.01)

(56) References Cited

OTHER PUBLICATIONS

Cao Yuan et al: "CMOS Image Sensor Based Physical Unclonable Function for Coherent Sensor-Level Authentication", IEEE Transactions on Circuits and Systems I: Regular Papers, IEEE, US, vol. 62, No. 11, Nov. 1, 2015 (Nov. 1, 2015), pp. 2629-2640.

* cited by examiner $$\forall (i,j) \in \Omega, E_{i,j} = \int_0^{T_{int}} e_{i,j}(t)\, dt = E_\Omega \text{ independant of } (i,j)$$

SYNTHETIC PHYSICALLY UNCLONABLE FUNCTION DERIVED FROM AN IMAGING SENSOR

TECHNICAL FIELD

This invention generally relates to the field of digital data processing and more particularly to methods and systems for key generation from an imaging sensor.

BACKGROUND

Imaging sensors such as cameras or displays are now widespread in consumer electronics devices such as smartphones or computer devices.

Few known approaches are directed towards the security of such sensors. Some existing approaches describe how to use cameras and/or displays to authenticate users. An imaging sensor is rarely considered for itself.

These existing approaches present limitations.

In particular, there is a need for methods and systems to generate reliably an identifier or key from an imaging sensor.

SUMMARY

There is disclosed a method of handling a sensor, comprising the steps of: defining a subset of sensor components of the sensor; challenging said subset under uniform conditions; receiving output signal values from said subset; for each component of the subset, determining the statistical moment of order i of the temporal distribution of the output signal value of said each sensor component; determining one or more outliers sensor components, said outliers sensor components being components whose $i^{th}$ order statistical moment has a difference with the mean value of the spatial distribution of the chosen moment over the subset superior in absolute value to a threshold, the $i^{th}$ order statistical moment of one sensor component being estimated on the temporal distribution associated to this sensor component. Developments describe in particular the use of imaging sensors, key generation, authentication, helper data files and the handling of videos.

In a specific embodiment directed towards an imaging sensor, there is disclosed a computer-implemented method of handling an imaging sensor comprising a plurality of pixels, the method comprising the steps of: defining a subset of pixels of the imaging sensor; taking N images while challenging said subset of pixels under spatially uniform conditions; receiving output signals from said subset of pixels; for each pixel of the subset of pixels, determining the statistical moment of order i of the temporal distribution of the signals of said each pixel for the N taken images; determining one or more outliers pixels, said outliers pixels being pixels whose $i^{th}$ order statistical moment has a difference with the mean value of the spatial distribution of the chosen moment over the subset superior in absolute value to a threshold, the $i^{th}$ order statistical moment of one pixel being estimated on the temporal distribution associated to this pixel when taking the N images.

There is disclosed a computer-implemented method of handling an imaging sensor comprising a plurality of pixels, the method comprising the steps of: defining a subset of pixels of the imaging sensor; taking N images while challenging said subset of pixels under spatially uniform conditions; receiving output signals from said subset of pixels; for each pixel of the subset of pixels, determining the statistical moment of order i of the temporal distribution of the signals of said each pixel for the N taken images; determining one or more outliers pixels, said outliers pixels being pixels whose $i^{th}$ order statistical moment moment(i) are such that $|moment(i)-mean|>threshold$, whereby the threshold is predefined and the mean is the mean value of the spatial distribution of said $i^{th}$ order statistical moment over the subset of pixels, the $i^{th}$ order statistical moment of a pixel being determined on the temporal distribution associated to said pixel when taking the N images.

Advantageously, residual and irreducible flaws of a manufactured imaging sensor can be leveraged for key generation.

Advantageously, the generated key is hardware-enabled so that it can be unique by construction. The generated key is reliable (to some extent, the property of reliability of the key can be ensured or controlled). A same key (modulo a fixed acceptable or predefined error rate) can be obtained when repeatedly generated.

Advantageously, embodiments of the invention leverage i.e. exploit the very high number of pixels which are addressable in image sensors. Experimental data has shown that a sufficient number of outliers' pixels can be identified and be further characterized, at least with current and foreseeable manufacturing technologies.

Said key generation can be usefully used for authentication and/or ciphering of data (confidentiality). The generated key also can be used as a signature (i.e. to sign a message).

Authentication designates the operation of identifying a computer device (e.g. by comparing collected identifiers). Authentication advantageously can be achieved by using a digital signature algorithm (random key and random/unpredictable nonce). In some embodiments, authentication can be enabled by using secret keys (e.g. HMAC, CMAC).

Ciphering refers to ability of protecting data e.g. by generating a secret (or private) key intrinsic to the imaging sensor and following to the consumer electronics device enclosing or securely associated to the imaging sensor. Asymmetric (private key and a nonce) or symmetric (secret key or stream cipher) encryption may be used.

Embodiments of the invention may advantageously be used for trusted computing (e.g. root of trust, i.e. hardware/software components that are inherently and initially trusted).

In some embodiments, a key can be used as a seed for a Deterministic Random Bit Generator (DRBG), also known as a pseudorandom number generator (PRNG).

In some embodiments, the presence of an embedded and accessible sensor (e.g. in a smartphone) can be leveraged. Advantageously, embodiments of the invention do not require additional hardware integration and/or modification of existing hardware, thereby does not increase manufacturing or operational costs.

Advantageously, embodiments of the invention allow protecting privacy and sensitive data. Advantageous embodiments include secure login to a mobile website (e.g. email account, social account, banking account, etc), signature of emails or documents, mobile payment (e.g. cryptocurrency or money transactions), and authentication of Internet of Things devices (e.g. smartwatches, smartphones, smart-meters), healthcare applications, automotive applications (e.g. cars door controlling), logistics and supply chain management (e.g. for electronic devices) applications, machine-to-machine communications (M2M), robotics or domotics.

BRIEF DESCRIPTION OF DRAWINGS

Embodiments of the present invention will now be described by way of example with reference to the accompanying drawings in which like references denote similar elements, and in which.

DETAILED DESCRIPTION

Figure 1:
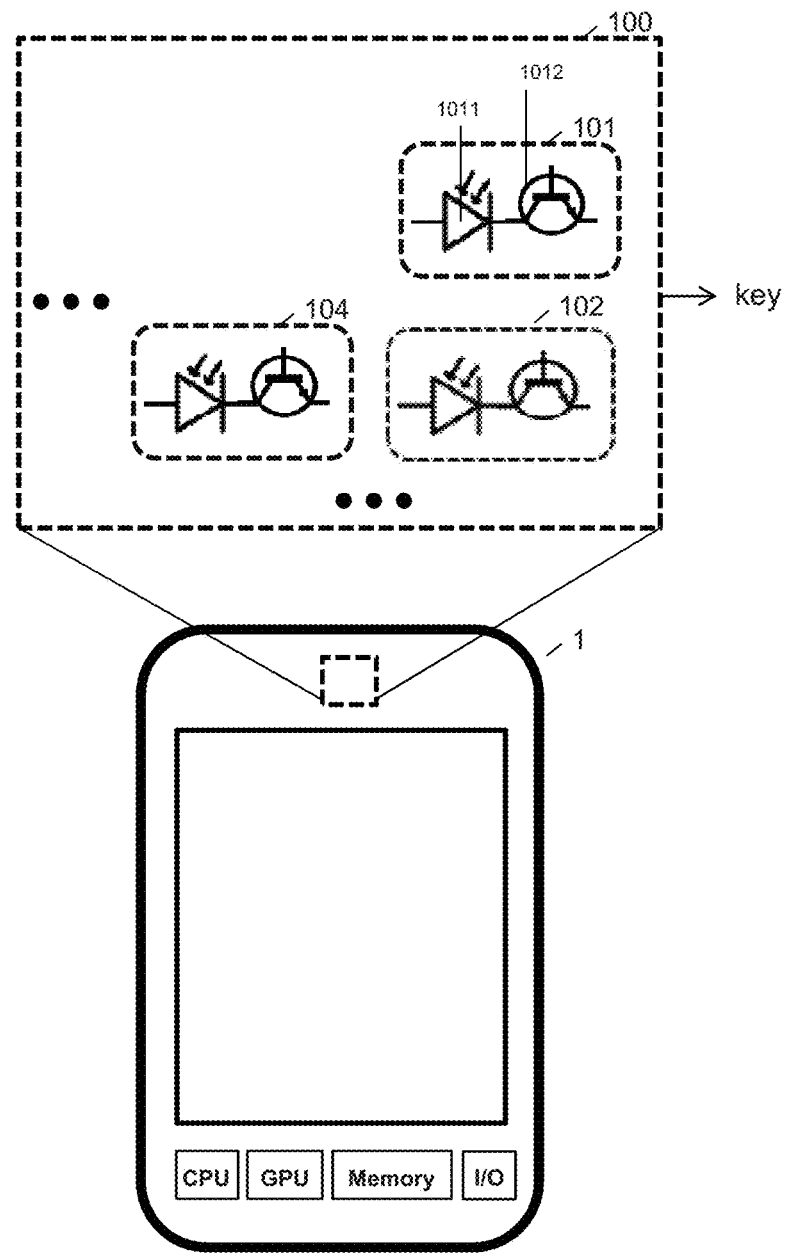
FIG. 1 shows a system view of an embodiment of the invention.

FIG. 1 shows a system view of an embodiment of the invention.

The figure shows a computer device 1 comprising an imaging sensor 100.

A "sensor" is an object or a device whose purpose is to measure and/or detect events or changes in its environment, and then provide a corresponding output.

The "sensor" manipulated by the invention can designate a broad range of sensors. A sensor produces or reflects ou outputs or provides values or samples or acquisition values or measurements.

The digitalization of the society leads to a fast-growing development of contactless technologies, which not only interconnect human beings, but also objects between themselves. This phenomenon is called Internet of Thinks (IoT): it is anticipated that ten times more machines will exchange information over interconnected networks, such as Internet or 4G/5G networks, than human beings. These objects are meant to collect information and, possibility, react on the real world. Information collection is important for IoT devices, to report meaningful status and awareness about their environment. Nowadays, a significant amount of measurements updated on-the-fly make up big data. Big data has value only if it has a high veracity, meaning that it can match well the environment in terms of reliability and accuracy of the collected measures. Thence, many devices with many diverse sensors are being and will be deployed. For improved veracity, multiple sensors are deployed, so as to collect multivariate (hence more rich) information (e.g., in various directions, or same instances of sensors placed at different locations, etc.), and which is in addition redundant, for an enhanced resistance to failure, and also to further increase the signal-to-noise ratio by diversity. As a consequence, IoT devices progress towards commoditization, which many sensors, aimed at being resilient. This in particular implies that there are many different venues to get the results of the "same" measurements (the goal of the variety of sensors is diverted to be used as a measurement of the measurement sensors themselves, all things being equal.

In some embodiments, no formed "images" are required; consequently, there is no need for an imaging sensor.

In some embodiments, a sensor according to the invention can be a time of flight (TOF) camera. Such a sensor does not construct an image per se but a matrix of distances.

In some embodiments, a sensor according to the invention can be a non-imaging thermal sensor, such as a bolometer. In some embodiments, a sensor can be a magnetic sensor, which can be turned into a matrix of measurements.

In an embodiment, a "sensor" is an imaging sensor. An image sensor or imaging sensor is a sensor that detects and conveys the information that constitutes an image. Image sensors comprise digital cameras, camera modules, medical imaging equipment, night vision equipment such as thermal imaging devices, radar, sonar, and others.

An imaging sensor comprises a plurality of sensors, i.e. "pixels" or "photosites" (e.g. 101, 102, 103, and 104).

A pixel 101 comprises a photodiode (e.g. 1011) and one or more transistors (e.g. 1012). A "photodiode" is a semiconductor device which converts light into an electrical current.

In digital imaging a "pixel" or "dot" is a physical point which is the smallest addressable element in an imaging sensor. A pixel considered by the invention can be "active" or "passive". An active-pixel sensor (APS) is an image sensor consisting of an integrated circuit containing an array of pixel sensors, each pixel containing a photo-detector and an active amplifier. The term "active pixel" sensor is also used to refer to the individual pixel sensor itself, as opposed to the image sensor (the image sensor can then be called an "active pixel sensor imager" or "active-pixel image sensor"). "Passive-pixel" sensors are pixel sensors without their own amplifiers or active noise cancelling circuitry (e.g. CCDs).

The figure further shows examples of a working pixel 101 (following the expected behavior or law), an "outlier" pixel 102 and another working pixel 104 (normal or average responses, among which outlier "pixels" can be selected).

"Pathological" pixels are not leveraged by the present invention. Pathological pixels are pixels which (i) repeatedly and (ii) abnormally react to uniform and comparable inputs. The abnormality criterion can dive into the properties of the signals indeed (order 1, order 2, and higher orders). Pathological pixels are likely to be found in low cost systems (e.g. Internet of Things devices, low end mobile devices), where the quality of the imaging device is not critical to those systems. Manufacturing processes controls for such devices are generally less strict and/or mature.

By contrast, embodiments of the present invention do leverage "outliers" pixels, i.e. pixels which follow the Gaussian law as do other pixels (inherently and residually due to manufacturing processes) but which present extreme values (in the wings of the Gaussian distribution). The Gaussian Law is associated to a residual dispersion of manufacturing processes and outputs for a same uniform input are spatially independently and identically distributed (regarding random variables). In some embodiments of the invention, if known, pathological pixels can be discarded (pure and simple). Outlier's pixels are likely to be found in more expensive devices, where the imaging functionality can be considered as core or critical (e.g. cameras, televisions, tablets, etc). Such devices are generally manufactured according to higher standards and requirements. The manufacturing is generally better controlled. Residual dispersion of the manufacturing process is general independently and identically distributed (regarding variables).

Depending on the input value (incident illumination) and the number of taken images N, outliers and pathological pixels may be indistinguishable. Knowing signals' distributions in more details (with much more images being acquired) can allow determining the probability that a given pixel is pathological and/or outliers. In other words, outliers and pathological pixels are not mutually exclusive. Yet handling such respective categories can be complimentary for concrete applications. For key generation purposes, it might be that the "superficial" determination and further handling of outliers' pixels can be easier to perform than a "deep" analysis at second moment order to determine pathological pixels. Such scenario depends in particular on the technology and on the manufacturing process used for the imaging sensor.

Taking N images allows estimating within a certain confidence interval the ith statistical moments of the temporal response distribution for each pixel. For a given order i, the spatial distribution of the ith order moment over the subset allows to identify outliers pixels which are of the ith considered order at both wings of the Gaussian-like distribution (value without n standard deviation away from the mean, where n is tuned depending on the number of outliers pixels needed so basically the length of the identifier/key).

Pathological pixels according to the invention are likely to be found in low cost systems (e.g. Internet of Things devices, low end mobile devices), where the quality of the imaging device is not critical to those systems. Manufacturing processes controls for such devices are generally less strict and/or mature.

Outliers' pixels according to the invention are likely to be found in more expensive devices, where the imaging functionality can be considered as core or critical (e.g. cameras, televisions, tablets, etc). Such devices are generally manufactured according to higher standards and requirements. The manufacturing is generally better controlled. Residual dispersion of the manufacturing process is general independently and identically distributed (regarding variables).

An "imaging sensor" considered by the invention can be diverse.

Examples of image sensors' types manipulatable by the invention comprise semiconductor charge-coupled devices (CCD), active pixel sensors in complementary metal-oxide-semiconductor (CMOS), N-type metal-oxide-semiconductor (NMOS, Live MOS) technologies and others. APS sensors can be used in camera phones, in digital radiography, or in security cameras for example. CMOS type sensors are widely used, from digital photography to mobile phone cameras. A standard CMOS APS pixel comprises of a photodetector (a pinned photodiode), a floating diffusion, a transfer gate, reset gate, selection gate and source-follower readout transistor—the so-called 4T cell. The use of intrapixel charge transfer can offer lower noise by enabling the use of correlated double sampling (CDS). For applications such as large-area digital X-ray imaging, thin-film transistors (TFTs) can also be used in APS architecture.

In some embodiments, the imaging sensor can be a planar Fourier capture array (PFCA), which is a camera composed of angle-sensitive pixels which requires no mirror, lens, focal length, or moving parts. One or more pixels manipulated by embodiments of the invention can comprise an angle-sensitive pixel (ASP), which is a light sensor made entirely in CMOS with a sensitivity to incoming light that is sinusoidal in incident angle.

In some embodiments, the imaging sensor can be a back-illuminated sensor, also known as backside illumination (BSI or BI) sensor.

An imaging sensor can be as example a CMOS camera sensor.

In addition to emission, a LED can be used as a photodiode in light detection.

A solar cell used to generate electric solar power is a photodiode.

Imaging sensors can be manufactured in a two-dimensional grid or array or matrix, or as a square or any shape, including three dimensional shapes.

The "computer device" according to the invention can be a smartphone or any consumer electronics device (e.g. laptop, smart watch, virtual reality or augmented reality device, game console, television, an Internet of Things device as well; for example a smart meter in domotics; mecatronics components in automotive; medical devices or components in healthcare; elements for infrastructure e.g. smart city, transportation, logistics; banking devices in finance; etc).

The computer device can comprise diverse resources (computing resources CPU, memory or storage resources, graphical display resources GPU and communication resources I/O). Resources implement one or more of the described steps can be accessed remotely (e.g. in the Cloud or remote servers) and/or locally (in the computer device). In other words, for example, key generation can be triggered from a remote server and the computer device as a smartphone can perform the steps to generate or verify the key.

Figure 2:
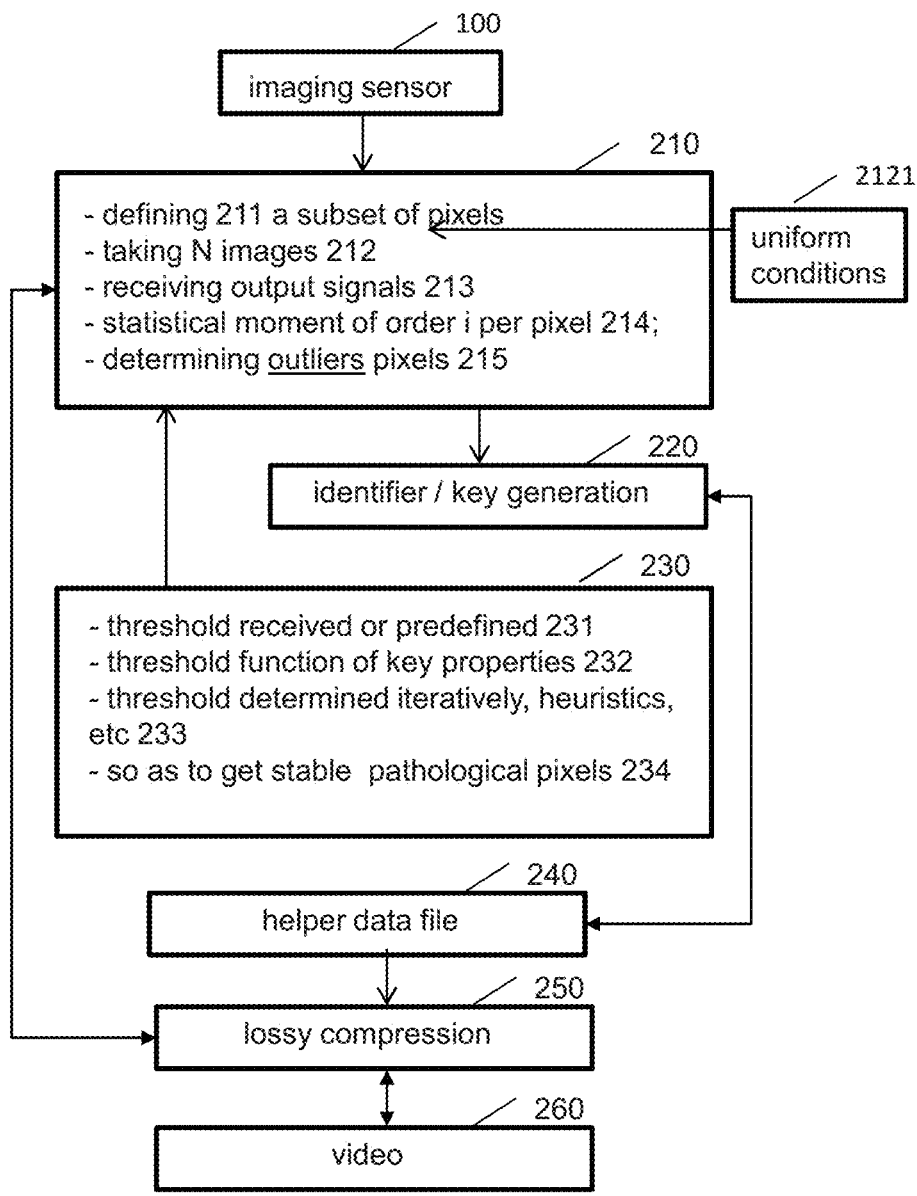
FIG. 2 illustrates examples of steps of the method according to the invention.

FIG. 2 illustrates examples of steps of the method according to the invention.

In an embodiment, there is disclosed a method of handling a sensor, the method comprising the steps of: defining a subset of sensor components of the sensor; challenging said subset of sensor components under uniform conditions; receiving output signal values from said subset of sensor components; for each component of the subset of sensor components, determining the statistical moment of order i of the temporal distribution of the output signal value of said each sensor component; determining one or more outliers sensor components, said outliers sensor components being components whose $i^{th}$ order statistical moment has a difference with the mean value of the spatial distribution of the chosen moment over the subset superior in absolute value to a threshold, the $i^{th}$ order statistical moment of one sensor component being estimated on the temporal distribution associated to this sensor component.

In an embodiment, the sensor is an imaging sensor and a sensor component is an active pixel, the imaging sensor thereby comprising a plurality of active pixels.

In an embodiment, the step of challenging the subset of active pixels under uniform conditions comprises the step of acquiring a plurality N of images.

In an embodiment, the sensor is a combination of independent sensors.

In an embodiment, the method further comprises the step of generating an identifier from the determined outliers' sensor components.

In an embodiment, the method further may comprise the step of comparing the generated identifier and/or hash value thereof with other identifiers to authenticate the imaging sensor.

In an embodiment, the threshold is received and/or predefined.

In an embodiment, the threshold is function of one or more desired properties of the generated identifier, said properties comprising bit length and/or bit error.

In an embodiment, the number of images N and the threshold is set so as to determine repeatedly the same outliers pixels for a given statistical order i.

In an embodiment, information about outliers' sensor components is stored in a helper data file.

In an embodiment, uniform conditions are spatially uniform conditions obtained by closing the shutter associated with the imaging sensor.

In an embodiment, uniform conditions are spatially uniform conditions obtained by grounding out the photodiodes associated the pixels of the subset of pixels.

In an embodiment, uniform conditions are spatially uniform conditions obtained by adjusting the light source and/or by shaping the light beam.

In an embodiment, an image is in a lossy compression format.

In an embodiment, an image is a video frame.

In an embodiment, the subset of pixels is determined according to structural information on the shared electronics of the sensor or imaging sensor.

There is disclosed a system configured to handle a sensor, comprising: a processor (or circuit e.g. FPGA) configured to define or to receive information about a subset of sensor components of the sensor, said subset of sensor components being challengeable under uniform conditions; a receiver (or circuit or processor) configured to receive output signal values from said subset of sensor components; for each component of the subset of sensor components, the processor being configured to determine the statistical moment of order i of the temporal distribution of the output signal value of said each sensor component; the processor being further configured to determine one or more one or more outliers sensor components, said outliers sensor components being components whose $i^{th}$ order statistical moment has a difference with the mean value of the spatial distribution of the chosen moment over the subset superior in absolute value to a threshold, the $i^{th}$ order statistical moment of one sensor component being estimated on the temporal distribution associated to this sensor component.

In an embodiment, the processor (the same processor or another one) is further configured to generate an identifier from the determined outliers' pixels.

Other embodiments are now described. These embodiments are specifically directed towards imaging sensors but may be applicable to other situations involving other types of sensors.

In an embodiment, there is described a computer-implemented method of handling an imaging sensor 100 comprising a plurality of pixels, the method comprising the steps of: defining 211 a subset of pixels of the imaging sensor; taking 212 N images while challenging said subset of pixels under spatially uniform conditions; receiving 213 output signals from said subset of pixels; for each pixel of the subset of pixels, determining 214 the statistical moment of order i of the temporal distribution of the signals of said each pixel for the N taken images; determining 215 one or more outliers pixels, said outliers pixels being pixels whose statistical distance to other pixels of the subset is superior to a threshold.

The threshold (and for the case i=1, the statistical distance) can be set so as to maximize the reliability of the generated identifier. The statistical distance can be determined between temporal distributions of signals of pixels of the subset of pixels.

In an embodiment, there is disclosed a computer-implemented method of handling an imaging sensor comprising a plurality of pixels, the method comprising the steps of: defining a subset of pixels of the imaging sensor; taking a plurality N of images while challenging said subset of pixels under spatially uniform conditions; receiving output signals from said subset of pixels; for each pixel of the subset of pixels, determining the statistical moment of order i of the temporal distribution of the signals of said each pixel for the plurality N of taken images; determining one or more outliers pixels, said outliers pixels being pixels whose $i^{th}$ order statistical moment has a difference with the mean value of the spatial distribution of the chosen moment over the subset superior in absolute value to a threshold, the $i^{th}$ order statistical moment of one pixel being estimated on the temporal distribution associated to this pixel when taking the plurality N of images.

In an embodiment, the method further comprises the step of generating an identifier from the determined pixels.

In an embodiment, the method further comprises the step of comparing the generated identifier and/or hash value thereof with other identifiers to authenticate the imaging sensor.

In an embodiment, the threshold is received or predefined.

In an embodiment, the threshold is function of one or more desired properties of the generated identifier, said properties comprising bit length and/or bit error.

In an embodiment, the number of images N and the threshold is set so as to determine repeatedly the same outliers pixels for a given statistical order i.

In an embodiment, coordinates of outliers' pixels are stored in a helper data file.

In an embodiment, spatially uniform conditions are obtained by closing the shutter associated with the imaging sensor.

In an embodiment, spatially uniform conditions are obtained by grounding out the photodiodes associated the pixels of the subset of pixels.

In an embodiment, spatially uniform conditions are obtained on the subset of pixels by adjusting the light source and/or by shaping the light beam.

In an embodiment, an image is in a lossy compression format.

In an embodiment, an image is a video frame.

In an embodiment, the subset of pixels is determined according to structural information on the shared electronics of the imaging sensor.

There is disclosed a system configured to handle an imaging sensor comprising a plurality of pixels, said system comprising: a processor configured to define or to receive information about a subset of pixels of the imaging sensor; the imaging sensor being configured to take N images while challenging said subset of pixels under spatially uniform conditions, N being equal or superior to 1; a receiver configured to receive output signals from said subset of pixels; for each pixel of the subset of pixels, the processor being configured to determine the statistical moment of order i of the temporal distribution of the signals of said each pixel for the N taken images, wherein N is superior or equal to i; the processor being further configured to determine one or more outliers pixels, said outliers pixels being pixels whose $i^{th}$ order statistical moment has a difference with the mean value of the spatial distribution of the chosen moment over the subset superior in absolute value to a threshold, the $i^{th}$ order statistical moment of one pixel being estimated on the temporal distribution associated to this pixel when taking the N images.

In an embodiment, the processor (or another processor) is (further) configured to generate an identifier from the determined outlier's pixels.

The term "defining", used in connection with step 211, underlines that the choice of pixels (composing the subset of pixels which will be further handled by steps of the invention) is in fine arbitrary. For example, the subset can be user-defined and/or random and/or selected by a third party (e.g. machine or algorithm), etc. The subset of pixels is the pool of candidate pixels, which will be further considered or manipulated.

Regarding the "subset of pixels", the larger the subset of pixels, the more malfunctions in the manufacturing process can lead to useful pixels. In some embodiments, knowledge about the imaging sensor and pixels thereof (e.g. manufacturing weaknesses, for example received as metadata) and/or other reasons (e.g. pixels remaining in shadow when the shutter is opened) can lead to select one or more specific subsets.

In an embodiment, the defined subset can be the entire matrix or array of pixels of the imaging sensor (upped bound included). In some embodiments, the subset of pixels can comprise one or more rows (lines) and/or one or more columns of the imaging sensor. In some embodiment, the subset of pixels can comprise pixels forming lines, diagonals, squares, rectangles, ovals, ellipses, etc. The subset of pixels can comprise patterns, i.e. regular repetition of motifs. Pixels can be contiguous, or not. Advantageously, unexposed pixels (e.g. those remaining in the dark even if the shutter is opened) can be used.

The considered subset(s), being smaller in surface than the entire matrix, can lead to improved performances (faster discovery/enrollment and/or faster challenge-response times).

The expression "taking N images", used in connection with step 212, can be interpreted in that an image acquisition process is performed on or after a triggering action. The triggering action in itself is indifferent and different triggering schemes are possible. In an embodiment, the acquisition can start once appropriate spatially uniform conditions are met. In some embodiments, image acquisition is continuous and images are filtered out after that the uniformity of acquisition is assessed. Image capture also can be conditional to user action. In some other embodiments, image acquisition can result from continuous evaluation of environmental conditions and obtained results (including results obtained progressively or on-the-fly).

Regarding the number of images to be taken, different compromises can be made, depending on operational parameters, for example between acquisition environment (e.g. temperature drifting, available duration to take images, shutter speeds, memory available, etc), target key length, available/discoverable pixels, reliability target of the generated key, etc.

Different phases can be distinguished. While a high number of images can be taken at or during enrollment (to determine and characterize outliers pixels), a limited number of images can be required at run-time (to query or challenge known outliers pixels in order to determine the identifier). In an embodiment, the method is "burst-less", i.e. does not require a plurality of images to be taken at run-time. With a single image, a sufficient number of outliers' pixels can be used to generate the identifier with a desired key length. In an embodiment, the method can use a "burst" of images (i.e. a plurality of images taken in the same physical conditions, in particular conditions of illumination, possibly during a short timeframe). This plurality of images can provide the data which can be leveraged to identify outliers' pixels.

The term "challenging" expresses that the underlying sensors (pixels made of photodiodes and transistors) can be "excited" or "solicited" or "queried" or "tested" or "interrogated" or "questioned". In some embodiments, such challenge can take the form of an illumination or enlightening.

The subset(s) of pixels are placed into spatially uniform conditions 2121. The expression «spatially uniform conditions» is now briefly discussed.

The term "spatially" underlines the spatial nature of the physical parameters being considered (for example photons reaching out the matrix of pixels of the imaging sensor, grounding out conditions), also in opposition to the reference of temporal parameters (noise in particular, i.e. the evolution of excitation of pixels over time).

The term "uniform" thus refers to the distribution in space of inputs. Depending on embodiments, some definitions out of general dictionaries can be applicable ("identical or consistent from place to place", "without variations in detail", "unvarying", "undeviating", "occurring in a manner independent of some variable"). For example, photons can reach out the matrix of photodiodes in no privileged direction.

Output signals (of pixels) are voltages. In some embodiments, inputs can be photons (when challenging photodiodes of pixels). In some other embodiments, pixels or transistors associated with photodiodes can be grounded out (literally inputs are reduced to zero). In other words, uniform "illumination" can be determined electronically. The term uniform can thus refer to photons and/or to the lack of photons (i.e. grounding out conditions). The expression «spatially uniform conditions» thus may mean «spatially uniform illumination conditions» and/or «spatially uniform grounding-out conditions». It must be noted that embodiments may not be mutually exclusive: absence of illumination, low illumination, controlled illumination, and grounding out conditions can be combined (for example for a subdivided matrix of pixels). Pixels can selectively be grounded out and/or illuminated.

According to a perspective oriented towards energy, it can be defined that each pixel (i.e. the photodiode associated with said pixel) of the selected subset of pixels receives substantially the same amount of energy during image acquisition time ("integration time"). The quantity "energy" (received by the matrix of pixels and thus by the subset of pixels) corresponds to the number of photons multiplied by h (Planck constant) times nu (frequency). Each of the considered pixels receives substantially the same amount of energy. The term "substantially" refers to the fact that photons cannot usually be counted exactly and/or strictly controlled experimentally. The very quantum nature of these systems also implies fundamental quantum uncertainties.

The expression «spatially uniform conditions» reflects the underlying principle that small fluctuations of experimental (illumination, grounding-out) conditions shall or do not induce noticeable variations of amount of energy received by pixels. Said differently, the total energy received by the sensor (all pixels) is the same. Even if local fluctuations can occur (some pixels can temporarily receive more energy, some less, there are quantum effects, etc), these variations of uniformity will not change the total energy received over integration time. Statistically, each pixel will have received the same amount of energy at the end of the considered period.

Within said boundaries ("substantially the same amount of energy received per pixel during image acquisition time"), various macroscopic variants can be performed. In the end, such temporal distribution of energy is indifferent.

In an embodiment, the method comprises a step of determining 215 one or more "outliers" pixels, said outliers pixels being pixels whose statistical distance to other pixels of the subset is superior to a threshold. The threshold (and for i=1, the statistical distance) can be set so as to maximize the reliability of the generated identifier. The statistical distance can be determined between temporal distributions of signals of pixels of the subset of pixels.

"Pathological" pixels are now discussed. The terminology used designate pixels which repeatedly and abnormally react to uniform and comparable inputs.

With respect to pathological pixels, high(er) statistical moment order can be considered. The abnormality criterion can dive into the properties of the signals indeed (superior moment orders).

At moment order 1 (i=1), the output voltage value is considered. In such a case, pathological pixels are those whose outputs are notably offset with respect to the others or even independent of the input, for example but not exhaustively stuck pixels or bright dots or dark dots. For i=1, advanced methods taking in account the whole temporal distribution can be used: statistical distances between the spatial distribution of the $i^{th}$ order values and the different pixel output value temporal distribution can advantageously be estimated to identify and select the pathological pixels.

At moment order 2 (i=2), the standard deviation of the temporal distribution is considered. Pixels which are agitated and/or which flicker and/or which are unstable and/or which are noised are then considered and leveraged.

At higher moment orders, distribution properties can be advantageously leveraged.

Skewness (i=3) designates the measure of the asymmetry of the probability distribution of a real-valued random variable about its mean. The skewness value can be positive or negative, or undefined. The qualitative interpretation of the skew is complicated and unintuitive. Advantageously, as real data points may not be perfectly symmetric, the determination of the skewness of the dataset indicates whether deviations from the mean are going to be positive or negative. In the end, such a property can be determined and further leveraged to determine pathological pixels, in turn leading to key generation. Measures of skewness comprise Pearson's coefficients, quantile-based measures, L-moments, distance skewness, Medcouple, etc.

Kurtosis (i=4) is a measure of the "tailedness" of the probability distribution of a real-valued random variable. In a similar way to skewness, kurtosis is a descriptor of the shape of a probability distribution. Several ways of quantifying kurtosis are possible.

Noticeably, pathological pixels are pathological within small variations of the chosen input. Quantitatively, input values can advantageously be selected knowing the nature of the "pathological" pixels (e.g. black or the absence of photons is more efficient to determine hot pathological pixels). The optimal input illumination can either maximizes the number of selected pixels or the reliability of the identifier extraction (measuring the bit error rates for multiples generation).

For moment order 1, the absence of lighting is advantageous because it is easier to determine deviations to a null value. There is also only one way to perform these conditions: the absence of photons (this also avoids nearby or adjacent pixels' perturbations). Pixels of the imaging sensor all appears to be identical at first and superficially. In fact they are not, as irreducible defects and differences exist between them.

The statistical characterization according to the invention (i.e. handling statistical moments of order i of the temporal distribution of signals) is advantageous in that it allows to deep dive into the properties of the imaging sensor and its constituents and to possibly extract a signature that can be both unique and possibly reproducible.

Taking a plurality of images increases the knowledge about each pixel (its "behavior"). Taking a plurality of images allows handling statistical analysis, in particular to estimate statistical moments (i.e. moments of orders 1 to n can be determined). The higher number of images the better confidence interval of the statistical moment estimation. Hence taking a high number of images ensures that temporal noise does not influence the selection of pixels. The more images, the more precise the knowledge of the distribution, the better pathological pixels can be determined. The statistical moment of order i refers to the number of images to be taken.

To estimate the $i^{th}$ order statistical moment with a finite confidence interval, a sufficient number of images are required. For example, with one single image, the pixel output value is the better estimation of the statistical moment of order i=1 (mean) but the confidence interval depends on the width of the statistical distribution ($2^{nd}$ order statistical moment). However, with one single image, variance or (2th order statistical moment) is at best steadily equal to zero or meaningless. Hence in an upstream sensor characterization phase, a high number of images could be acquired to precisely determine the statistical distributions of each pixel of the subset and then fix the number of images required in run-time to estimate the ith order statistical moment within a pre-determined and arbitrary small confidence interval.

Outliers' pixels of a sensor are not known "a priori". Outliers pixels are discovered (hidden absolute reality) or at least determined (relative truth) at enrollment phase (for example in the lab or the manufacturing facility). An exploration of the matrix can be performed (i.e. a «scan», in the meaning of exploring or analyzing the noise distribution and its intimate properties). Once discovered, coordinates of outliers pixels are known and can be exploited to generate an identifier (a key), which itself can serve for different purposes.

In some embodiment, i=1, a threshold or range of threshold can be used to determine one or more outliers pixels. In some embodiments, outliers' pixels can be determined according to a reference to an intermediate object, namely a "statistical distance". Such a reference distance advantageously allows for flexible developments of the invention (a statistical distance conveys broader consequences than a mere threshold). Examples of advantageous statistical distances comprise Kullback-Leibler divergence, Hellinger distance, total variation distance, Rényi's divergence, Jensen-Shannon divergence, Lévy-Prokhorov metric, Bhattacharyya distance, Wasserstein metric, Kolmogorov-Smirnov statistic, maximum mean discrepancy). Other alternative approaches than statistical distance can be considered (e.g. signal-to-noise ratio distance, Mahalanobis distance, energy distance, distance correlation, Łukaszyk-Karmowski metric).

The steps described hereinabove are not necessarily ordered in the way they are described therein. For example, images can be taken first and the subset of pixels can be defined afterwards.

For the example of a 128-bit key, the probability that the $n^{th}$ bit is equal to 0 (resp 1) is equal to the conditional probability that the $n^{th}$ bit is equal to 0 (resp 1) knowing the additional information placed in the helper data file.

In an embodiment, the computer-implemented method further comprises the step of generating 120 an identifier from the determined outliers' pixels.

By design, such an identifier (or a "key") is generally unique and its determination can be made reproducible on a dedicated device.

The coordinates of outliers' pixels (information position) can be used to derive an identifier (a key). Many different methods can be used to derive an identifier from outliers' pixels. A few examples are described hereinafter, considering one outlier pixel.

Given the 2 coordinates (Xi, Yi) of the considered outlier pixel i (for example Xi=450, Yi=1001), a first method can comprise the step of the considered outlier pixel i providing one bit, for example, the parity of Xi XOR the parity of Yi. In the provided example as the parity of Xi is 0 (pair) and of Yi is 1 thus the output is 0 XOR 1 thus 1. Numerous other methods can be applied (e.g. parity Xi XOR NON parity Yi).

Alternatively, a selected pixel can provide more than one output bit (n>1). The actual figure depends on dimensions of the imaging sensor. For example, for a sensor of 2464 by 3280 pixels, the working surface can be a square of 2^11 by 2^11 pixels (to maintain a symmetry between X and Y).

Coordinates of the 4 194 304 pixels (2048 by 2048) can be encoded over 11 bits. For example Xi=450 can be written in base 2 (over 11 bits) as "00111000010" and Yi=1001 can be written as "01111101001". Many different methods may be used to generate a key. For example, strings Xi and Yi can be concatenated into 0011100001001111101001 (or into 0111110100100111000010, or interlaced, or XORed, or otherwise composed). As a result, a string of 22 bits of information can be obtained.

In an embodiment (which can be applied or combined with any of the preceding steps), information position on Xi can be stored in a helper data file (in clear, or ciphered, managed as a secret) and Yi can be coded over M bits (as described above): this will allow to get a key of M bits. Thanks to helper data files which optimize outliers' pixel research without revealing anything about the identifier, the number of required images may be reduced.

In some embodiments, information position may not use coordinates (Xi, Yi) referential. As other coordinate systems are possible, the origin (referential center) can be chosen arbitrarily. For example, bit signs can be used: pixel (1,1) can be located anywhere on the matrix or array of pixels. As a consequence, the steps to extract a key may be diverse.

Key extraction more generally can result from (i) arithmetic and logical operations performed on the parity of the coordinates of the plurality of the outlier pixels, and/or from (ii) logical operations and/or combinations of output bits obtained by encoding in base 2 of the coordinates. Optionally, part of the information (i, ii) can be stored in a helper data file. Optionally, values of coordinates (i, ii) can be changed depending on the reference system.

It is underlined that a key can be extracted from one or more of such outliers' pixels. In other words, an optional selection step can be performed, consisting in selecting a set of outliers pixels among those having being determined (i.e. a further selection), in order to derive a key or identifier from said (second) selection. Advantageously, the way to handle the latter selection can be secret or tentatively (to further protecting the generated key).

The preceding methods and options described can be set as to extract key(s) from the knowledge of the outliers' pixels according to the invention. It is underlined that numerous variants of extraction are possible. Once known and kept stable, the key extraction can allow extracting reliably the same key out of the imaging sensor.

A given key may be obtained from the knowledge of outliers' pixels and of a set of arbitrarily but deterministic sequence of steps applied to a selection of outliers pixels.

In some embodiments, the generated key can be stored or cached (and further checked on demand, for example for a payment application).

In some embodiments, the generated key is not stored (in some situations, storing a generated key can raise security issues). In some embodiments, the SPUF ("synthetic PUF" or "artificial" PUF) according to the invention is challenged each and every time a key is needed. Key requests/generation can occur at a high rate (for example a key each second, as required by a payment platform). In some embodiments, the generated key can be stored (e.g. cache mechanism).

As examples of typical orders of magnitude, enrollment performed at manufacturing can be performed in matter of seconds or minutes (considering hundreds, thousands, if not millions of images for very stable isolation of outliers pixels); at runtime, knowing the e.g. 5-10 addressable reliable outliers pixels, query time can be a fraction of a second (e.g. few milliseconds). Signal analysis can be very brief. The required time duration is mainly determined by the acquisition of the N images.

In some embodiments, the method can comprise a step of seeding a Pseudo Number Random Generator with said generated identifier. Such an embodiment can be advantageously considered as a backup or fallback or substitute for a True RNG (which provides a different true random value at each query).

In an embodiment, the computer-implemented further comprises the step of comparing the generated identifier and/or hash value thereof with other identifiers to authenticate the imaging sensor.

Such an identifier can serve different purposes. For example, an identifier can be used to identify a computer device, i.e. by generating a secret which is intrinsic to the computer device consumer electronics (comprising the imaging sensor, itself comprising the outliers' pixels). By comparing (e.g. published, shared, etc) identifiers, authentication can be obtained. Many downstream applications can be further enabled (for example a payment platform can allow a transaction conditional to the retrieval of the appropriate identifier on the device, a software license check can use such a verification etc).

In an embodiment, the threshold 230 is received and/or predefined (231).

In an embodiment, the threshold can be given, i.e. received from another user or machine entity. The threshold can be predefined, for example locally accessible (e.g. stored in a memory accessible to the processor handling data to characterize outliers' pixels).

In an embodiment, the threshold 230 is function of one or more desired properties of the generated identifier, said properties comprising bit length and/or bit error (232).

In some embodiments, the threshold can be determined (233), and not predefined.

The determination or calculation can be performed in different ways: iteratively, by dichotomy, by applying heuristics, programmatically (i.e. computable as a result of an algorithm), analytically (i.e. computable by considering an analytical function the statistical moments of order i of the temporal distribution). For example, the threshold can be determined by dichotomy: given a first threshold giving an inferior bound, pixels can be analyzed, then ordered, then the statistical distance (for the specific case i=1) between pixels can be determined and maximized, the threshold can be placed half way and the loop can continue. The selection criterion or threshold can be iteratively increased or decreased. The threshold can be stored (and further protected, i.e. securely). Methods related to graph analysis can be applied (e.g. to determine overlaps and to maximize differences between samples values, i.e. to find pixels as different as possible but while maximizing the bit error rate and getting stable pixels.

Machine learning or clustering algorithms (k-means) may be used. In the case of a clustering strategy, the threshold is linked to the centroid distance between the more populated cluster ("non-pathological pixels") and others single or few pixels clusters which are precisely the ones pathological. In the case of a clustering strategy, the threshold is linked to the centroid distance between the more populated cluster ("non-outliers pixels") and others single or few pixels clusters which are precisely the ones outliers.

The "controllability" of the system considered by the invention is complex and can be manipulated in various ways. Downstream objectives can pilot or guide or influence or determine upstream parameters. Multi-objective optimization can be performed. Requirements or constraints or objectives can be given for various reasons (e.g. operational constraints, time available for image acquisition, renewals of keys e.g. every 250 milliseconds, desired reliability of keys, etc).

For example, to get a 128 bits key, a number n1 of pixels can be needed, and following N1 images can be needed for reliability requirements (N1 determines the confidence interval of the ith order moment estimation), and further the selection threshold can be adjusted/set accordingly to determine outliers pixels. According to another example, given that N2 images can be taken in operation and that 6 outliers pixels have been previously discovered, it can be determined that a key with a maximal length of 256 bits can be obtained. According to another example, it can well be that the number of images that can be taken can be limited: in turn this will limit the number of reliably selected pathological pixels and so the key size which can be obtained. The threshold (and for i=1, the statistical distance) can be set so as to maximize the reliability of the generated identifier. The statistical distance can be determined between temporal distributions of signals of pixels of the subset of pixels. The term "reliability" refers to a normalized quality for the skilled person (typically $10^{-9}$ number of errors for a bit, i.e. bit error rate).

In an embodiment, the number of images N and the threshold is set so as to determine repeatedly the same outliers pixels for a given statistical order i.

In an embodiment, the enrollment phase can be repeated so as to determine the reliable pixels, i.e. those which are consistently selected.

The term "reliable" refers to the fact that the same— physical—pixels (i.e. same coordinates, same positions, named "steady outliers pixels") will be determined if queries are repeated over time (under the same spatially uniform conditions). Stability means that whatever the pixels, the same pixels can be identified. It is indifferent to obtain a same number of pathological pixels if these change: it is required that the exact same individual pixels are found. Experimentally, asymptotic convergence can be observed. Manipulating the statistical distance (or threshold or range of thresholds) can allow identifying these reliable pixels.

The term "reliability" refers to repeated and multiple key generations: the number of errors (non-repeatedly constant) bit can be chosen arbitrary small. The required bit error rates (which precise values can depend on the envisioned application) can directly influence the number of required images N.

Methods related to graph analysis can be applied (e.g. to determine overlaps and to maximize differences between samples values, i.e. to find pixels as different as possible but while maximizing the bit error rate and getting reliable pixels).

In an embodiment, coordinates of outliers' pixels are stored in a helper data file (240).

In an embodiment, the coordinates (locations, positions e.g. lines and color) of outliers pixels can be memorized in a helper data file. The selected pixels can be later challenged. The helper data file can be burnt in the hardware and/or stored in software.

Advantageously, using a helper data file improves performances. Reliability is also improved because the interrogation of pixels is focused and avoids nearby or adjacent perturbations or hysterisis.

The knowledge stored in the helper data file is not sufficient for an attacker to reveal the key. Yet it can lead to significant improvements in performances at run-time (scan time is reduced but secret of the key is preserved). The probability of outputs bits given this helper data file information is a conditional probability: would an attacker know it, he wouldn't get access to the identifier or key. The probability that the nth bit is equal to 0 (resp 1) is equal to the conditional probability that the nth bit is equal to 0 (resp 1) knowing the additional information placed in the helper data file.

For example, the number of images N and the list of abscissa or ordinates of the selected pixels can be stored for higher performances, without revealing anything about the selection criterion on itself and about the positions of the selected pixels.

In an embodiment, spatially uniform conditions 2121 are obtained by closing the shutter associated with the imaging sensor.

In an embodiment, uniform illumination can be obtained by closing the shutter associated with the imaging sensor. In addition or alternatively, the imaging sensor can be placed in a black box limiting or preventing the presence of photons.

In an embodiment, the imaging sensor can be partly exposable to light while borders of the sensor can remain permanently in the shadow. The latter part can be exploited to perform steps of the method, e.g. without even the need for special illumination conditions and also in a continuous manner. In an embodiment, a first key (or part of key) is supported by the borders of the imaging sensor while a second key (or part of key) is supported by the matrix exposable to photons.

In an embodiment, spatially uniform conditions are obtained by grounding out the photodiodes associated the pixels of the subset of pixels.

In an embodiment, spatially uniform conditions are obtained on the subset of pixels by adjusting the light source and/or by shaping the light beam.

The light source can be a laser for example (e.g. LED). Internal signal modulation can be used (e.g. power modulation, wavelength, stroboscopic modes). Various optics and masks can be used (e.g. optical masks and/or mechanical masks, optics such as lens or beam shaping devices applied to one or more lighting sources, said lighting sources delivering photons of configurable wavelength). In an embodiment, a predefined graphical "mask" is applied (e.g. chessboard, patterned image, subdivided parts of the matrix is selectively challenged, e.g. those pixels of the shadowed part are solicited). A configurable mask can be placed in front of the imaging sensor when taking pictures. The mask can comprise pattern (e.g. lines, grids, chessboard, etc).

In an embodiment, an image is in a lossy compression format (250).

Embodiments of the invention can address lossless compression but also lossy compression algorithms used in images. Lossless compression is a class of data compression algorithms that allows the original data to be perfectly reconstructed from the compressed data (for example FLAC is lossless for audio signals). Being unmodified, pixel signals can be analyzed and noise manipulation can allow efficient key extraction. Lossy compression permits reconstruction only of an approximation of the original data.

A lossy compression algorithm can affect the first moment order but remains indifferent at higher orders.

In an embodiment, raw data is handled (i.e. no compression, signals output by pixels without post-processing). The expression "raw data" designates data associated with each pixel without post-processing. In modern imaging sensors embedded in consumer electronics, access to raw data is generally possible in software. For example, raw data files can be stored on SD cards in .RAW format.

In some specific imaging circuits however, access to RAW data files may be complicated, as post-processing steps can be applied directly in hardware to the signals captured by pixels. For example, functions such as "LSC" and/or "spot pixel compensation" can occur and can affect the raw data, adding undesirable noise to the signals captured by pixels. A bypass is to get access to raw data at hardware level. The method also can be robust to some of these post-processing steps. Post processing of the signals output by pixels can affect spatial noise (distribution). Pre or post processing=off-chip lossy compression e.g. JPEG, video encoding MP4, in-chip hardware Channel Double Sampling. The claimed method by handling statistical moments of higher order of the temporal noise is robust to said pre/post processing affecting spatial distributions (values can be centered, distributions can be shifted, etc).

In an embodiment, an image is a video frame (260).

The acquired images or parts thereof can be video frames. Video compression algorithms and codecs combine spatial image compression and temporal motion compensation. Like the preceding observation regarding lossy compression, these video compression and compensation algorithms do not bar the invention to work. Advantageously, current imaging sensors in consumer electronics devices typically can take up to 30 images per second, if not considerably more. Such orders of magnitude allow getting interesting key lengths and this rapidly.

In an embodiment, the method can comprise a step of detecting or determining post-processing step applied to one or more images is detected. The method in turn can operate at higher moment order (e.g. plus one): advantageously, a key can still be extracted from the imaging sensor outputs. In order words, technologies like Channel Double Sampling (CDS) can be implemented in hardware and can obfuscate the properties of individual pixels. In such a case, the analysis of moments of superior order can allow to perform steps of the method and to still generate keys.

PUFs are now briefly discussed. A PUF is known to be a Physically Unclonable Function, i.e. a hardware function providing a response when a challenge is applied to the considered piece of hardware. It is to be underlined that the very definition of this technical object or embedding "Physically Unclonable Function" is still intensely debated, amongst persons who can be qualified as "skilled persons in the art". The term is not yet standardized. For example, associated properties of a PUF (e.g. "reliability" or "unclonability" properties) are subtle and therefore debated. The term PUF in fine appears to be a naming convention, which lacks reliable and clear definition.

In the present case, described method steps do indeed characterize a PUF. Embodiments of the invention enable to create a "Physically Unclonable Function": commonly accepted properties of a PUF are matched by the emerging properties of the method steps once performed.

Fixed-Pattern Noise (FPN) is now briefly discussed. FPN designates the noise on digital imaging sensor. The invention fundamentally differs from FPN and related techniques. At least two aspects can be mentioned.

First, FPN manipulates output values of pixels, i.e. at moment order 1. By contrast, the invention goes beyond FPN, as it generalizes to statistical moments of higher order. According to the invention, the selected pixels are those which are the most abnormal given a selection criterion which operates at a moment of order i with respect to a threshold, said threshold being empirically determined (for example iteratively, heuristics, machine-learning, clustering, graph algorithms etc). This comparison allows extracting a number of bits as desired. Experimental data results indicate that the reservoir of candidate pixels is larger than the necessary number of pixels to construct key with standard key length in the industry (128 up to 4096 bits).

Second, FPN considers the spatial noise (in pixels' output signals), which is not considered by the present invention (in terms of space, the considered aspect relates to the input and not to the output). Whatever the FPN, embodiments of the invention do consider outliers pixels. To some extent, embodiments of the invention rely on the fact (or hypothesis) that outliers pixels appear randomly in or on the imaging sensor (homogeneously distributed on the surface given the dimensions of the imaging sensor). Some experiments have shown that this hypothesis is valid. The statistical law of interest in the present case remains the law of large numbers (imperfections of manufacturing processes of FPN).

Figure 3:
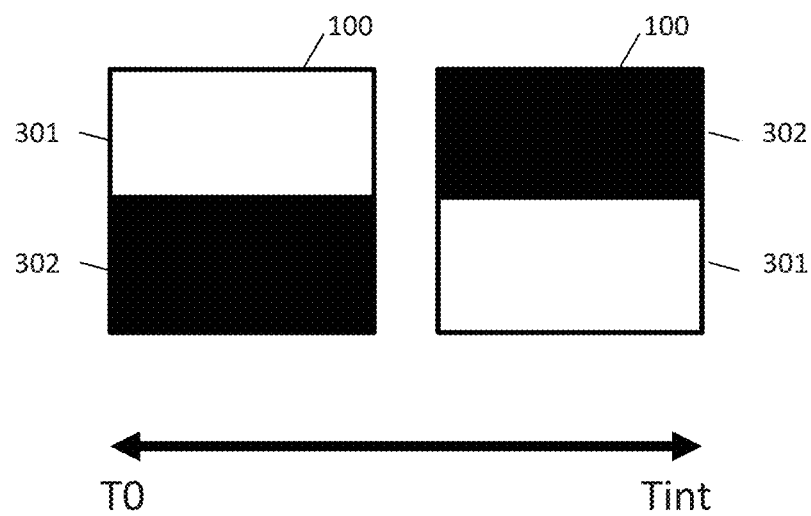
FIG. 3 illustrates an example of uniform conditions.

FIG. 3 illustrates an example of uniform conditions.

As expressed by equation 310, over time [T0, T int] the considered pixels receive the same amount of energy: this leaves room for a wide range of energy distribution profiles over time. For example a subsets of the pixels 301 of the imaging sensor 100 (or part of it) can receive much more energy or light at start while some other 302 can remain in the dark, then the situation can evolve and be reversed: at the end of integration time/image acquisition time interval [T0, T int], pixels will have had received the same amount of energy. Various energy distribution profiles can thus be implemented.

In mathematical terms (equation 1), $$\forall (i,j) \in \Omega, E_{i,j} = \int_0^{Tint} e_{i,j}(t)dt = E_\Omega \text{ independent of } (i,j)$$

wherein $e_{i,j}(t)$ dt is the energy received by the photodiode during the time dt, hence (equation 2):

$$e_{i,j}(t)dt = N_\nu(i,j) \times h\nu$$

wherein $N\nu$ (i, i) is the number of incident photons of frequency $\nu$ on the photodiode of pixel (i, j) and h represents Planck constant.

Experimental macroscopic conditions (e.g. image acquisition triggering, stability, alignment, illumination conditions) can be controlled to some extent (for example, temperature of the device comprising the imaging sensor can evolve over minutes; image acquisition being performed significantly faster can be indifferent to temperature changes). At least, experimental conditions can be mitigated and tradeoffs can be found. Independently, at photonic level, the exact distribution of photons onto the matrix of pixels is not controllable as such (the exact number of photons received by each pixel cannot be measured and a fortiori controlled), so as the photoelectric conversion efficacy of each pixel (for example). Yet the associated aleas do not imply consequences, from a statistical standpoint. As a result, it is necessary and sufficient to place the considered pool of pixels (which are by definition adjacent to one another, i.e. placed in the same environmental conditions). For example, even if a few photons remain in the chamber containing the imaging sensor, uniformity condition can be met.

Given the requirement of uniform conditions, various corresponding embodiments are possible. Experimentally, uniform illumination conditions can be obtained by using various optical masking, beam shaping and/or light source adjustments. Uniform conditions also can be obtained by grounding out the photodiodes and/or transistors. In particular, illumination can be controlled to some extent: predefined color spaces for example can be used. The subset of pixels (e.g. imaging sensor) can be placed in the dark (no photons, i.e. shutter closed), or even reinforced dark (dark chamber in addition to closed shutter). Advantageously, measuring the noise of pixels at rest (without excitation, leak currents) optimizes or leverages the sensitivity of pixels. In some embodiments, rather than obscuring pixels, the subset can be saturated (e.g. flash), but the latter increases noise i.e. does not exploit sensitivity of pixels in an optimal manner, which degrees of freedom are constrained. In some embodiments, predefined color spaces can be used (for example yellow color values RGB 254 221 0). Such one or more intermediate colors can present advantageous tradeoffs (sensitivity due to manufacturing technologies, discovery time, query time, resulting reliability, etc). Sequence of illuminations and/or colors can be used (e.g. dark, yellow, green, dark).

Figure 4:
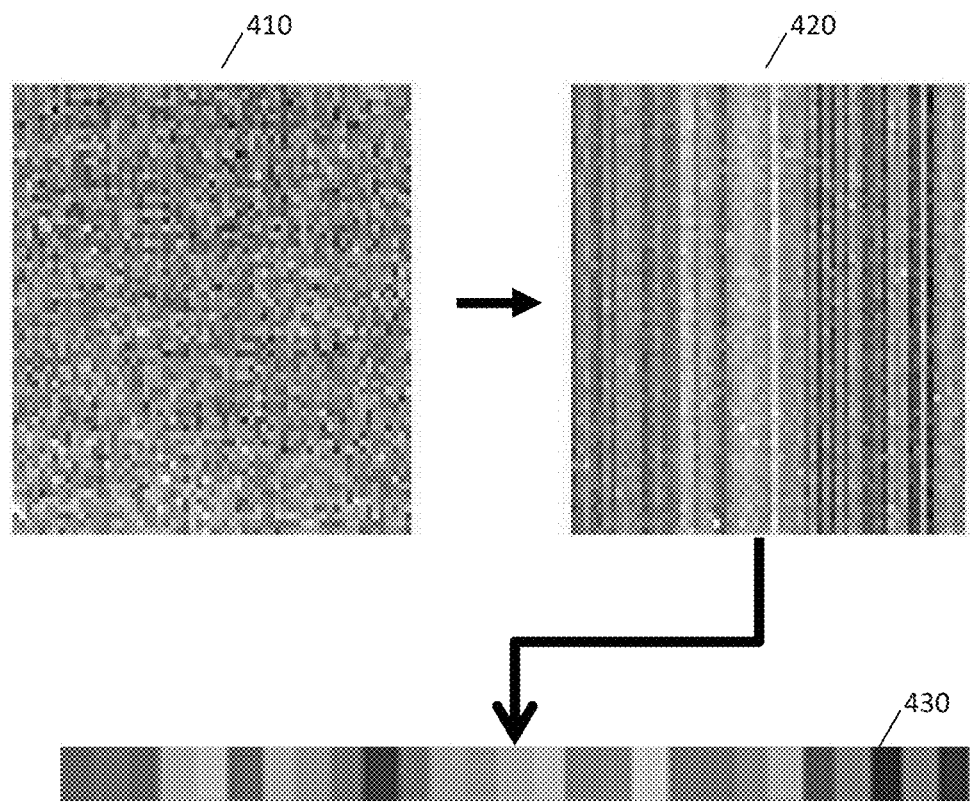
FIG. 4 illustrates structural aspects of specific embodiments leveraging shared electronics in the imaging sensor.

FIG. 4 illustrates structural aspects of some embodiments of the invention leveraging shared electronics in an imaging sensor.

In an embodiment, the subset of pixels is determined according to structural information on the shared electronics of the imaging sensor.

The expression "shared electronics" refers to the fact that some parts (i.e. transistors) of the imaging sensor can be shared amongst a plurality of photodiodes. A standard CMOS pixel for example can be a so-called 4T cell, comprising a photodetector (a pinned photodiode), a floating diffusion, a transfer gate, reset gate, selection gate and source-follower readout transistor. In some architectures, subparts can be shared between cells (a 3T pixel comprises the same elements as the 4T pixel except the transfer gate and the photodiode).

More generally, other parts than transistors can be shared. For example, shared electronics may comprise "shared pixels", "column amplifiers", "shared transistors" etc.

Shared electronics leads to internal correlations of signals. These structural features in the end influence the spatial noise. Accordingly, related to the steps of the method handling temporal distributions, advantageous optimizations can be determined given these underlying hardware differences.

In an embodiment, these structural properties can lead to specific selections of pixels (the subset of pixels which is considered).

In the example of pixels 410, each photodiode is associated with a transistor. The example 420 shows an example with shared electronics (here with column amplifier): noise is "spread" over a column (there is a loss of spatial entropy).

In an embodiment, it may be advantageous to average by column (as a projection, i.e. lines values are added and then divided by the number of lines), as shown in 430. In the latter case, temporal information is gained (relatively to spatial noise i.e. the ratio spatial over temporal noise is affected).

There is disclosed a computer program comprising instructions for carrying out one or more steps of the method when said computer program is executed on a computer.

There is disclosed a system comprising means to perform one or more steps of the described methods. In space, some steps can be performed locally and/or remotely (e.g. in the smartphone comprising the imaging sensors, possibly with some steps being performed in the network or in the cloud). Local execution can involve (specific/dedicated and/or generic) hardware blocks, and/or software. Corresponding hardware circuits can be distributed within the computer device, or gathered in a specific circuit. In time, some steps can be performed in the past (e.g. prior steps, "offline", etc) and/or in the present time (e.g. "online").

In an embodiment, the method according to the invention can be implemented by an entirely embedded hardware block. In an embodiment, the disclosed method can be performed by embedded hardware and software running on a local processor. Some embodiments of the disclosed invention can be entirely hardware embodiments. Some embodiments can be entirely software embodiments. Some embodiments can contain both hardware and software elements. The invention also can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, or semiconductor system (or apparatus or device) or a propagation medium.

The invention claimed is:

1. A method of handling a sensor, the method comprising: defining a subset of sensor components of the sensor; challenging said subset of sensor components under uniform conditions;
receiving output signal values from said subset of sensor components;
for each component of the subset of sensor components, determining the statistical moment of order i of the temporal distribution of the output signal value of said each sensor component;
determining one or more outliers sensor components, said outliers sensor components being components whose $i^{th}$ order statistical moment has a difference with the mean value of the spatial distribution of the chosen moment over the subset superior in absolute value to a threshold, the $i^{th}$ order statistical moment of one sensor component being estimated on the temporal distribution associated to this sensor component.

2. The method of claim 1, wherein the sensor is an imaging sensor and wherein a sensor component is an active pixel, the imaging sensor thereby comprising a plurality of active pixels.

3. The method of claim 2, wherein the challenging the subset of active pixels under uniform conditions comprises acquiring a plurality N of images.

4. The method of claim 3, wherein the number of images N and the threshold is set so as to determine repeatedly the same outliers pixels for a given statistical order i.

5. The method of claim 2, wherein uniform conditions are spatially uniform conditions which are obtained by closing the shutter associated with the imaging sensor and/or by grounding out the photodiodes associated the pixels of the subset of pixels and/or by adjusting the light source and/or by shaping the light beam.

6. The method of claim 2, wherein the subset of pixels is determined according to structural information on the shared electronics of the imaging sensor.

7. The method of claim 1, wherein the sensor is a combination of independent sensors.

8. The method of claim 1, further comprising generating an identifier from the determined outlier's sensor components.

9. The method of claim 8, further comprising comparing the generated identifier and/or hash value thereof with other identifiers to authenticate the imaging sensor.

10. The method of claim 8, wherein the threshold is function of one or more desired properties of the generated identifier, said properties comprising bit length and/or bit error.

11. The method of claim 1, wherein the threshold is received or predefined.

12. The method of claim 1, wherein information about outliers' sensor components is stored in a helper data file.

13. A computer program product comprising computing instructions stored on a non-transitory computing storage medium for carrying out the method according to claim 1 when said computing instructions are executed on a computer.

14. A system configured to handle a sensor, comprising:
a processor configured to define or to receive information about a subset of sensor components of the sensor, said subset of sensor components being challengeable under uniform conditions;
a receiver configured to receive output signal values from said subset of sensor components;
for each component of the subset of sensor components, the processor being configured to determine the statistical moment of order i of the temporal distribution of the output signal value of said each sensor component;
the processor being further configured to determine one or more one or more outliers sensor components, said outliers sensor components being components whose $i^{th}$ order statistical moment has a difference with the mean value of the spatial distribution of the chosen moment over the subset superior in absolute value to a threshold, the $i^{th}$ order statistical moment of one sensor component being estimated on the temporal distribution associated to this sensor component.

15. The system of claim 14, the processor being further configured to generate an identifier from the determined outliers pixels.

* * * * *